United States Patent [19]

Abel

[11] Patent Number: 4,599,006

[45] Date of Patent: Jul. 8, 1986

[54] CARTRIDGE BEARING ASSEMBLY

[75] Inventor: Martin L. Abel, Franklin, Mich.

[73] Assignee: Permawick Bearing Corporation, Detroit, Mich.

[21] Appl. No.: 742,123

[22] Filed: Jun. 6, 1985

Related U.S. Application Data

[63] Continuation of Ser. No. 495,410, May 17, 1983, abandoned, which is a continuation-in-part of Ser. No. 257,098, Apr. 24, 1981, Pat. No. 4,392,753, which is a continuation of Ser. No. 081,614, Oct. 3, 1979, abandoned.

[51] Int. Cl.⁴ .............................................. F16C 23/04
[52] U.S. Cl. .................................. 384/136; 384/402; 384/408
[58] Field of Search ............... 384/136, 135, 402, 408, 384/409; 308/DIG. 8

[56] References Cited

U.S. PATENT DOCUMENTS

| | | |
|---|---|---|
| 2,922,682 | 1/1960 | Abel . |
| 3,034,838 | 5/1962 | Abel . |
| 3,280,027 | 10/1966 | St. Pierre et al. ............ 252/45 |
| 3,317,256 | 5/1967 | Ernest . |
| 4,008,928 | 2/1977 | Abel . |

*Primary Examiner*—Lenard A. Footland

*Attorney, Agent, or Firm*—Lane & Aitken

[57] ABSTRACT

A self-aligning, self-contained, self-lubricating cartridge bearing assembly including a nonporous bearing member having a central bore sized to receive a rotatable shaft. The bearing member has an aperture extending radially from its central bore to its outer surface to receive a contractor made of fibrous material. The bearing member may be made of die cast aluminum alloy. The bearing member is held in a mounting member by two retainers. An oil-impregnated wicking material surrounds the bearing member and contactor. An oil slinger sized to fit on the rotatable shaft for rotation therewith is positioned adjacent to the bearing member to sling lubricant radially outward. End caps are provided which retain the oil-impregnated wicking material inside the bearing assembly. In some embodiments, the retainers are resilient spring elements which, by their resilience, hold the bearing member in a captive ball and socket configuration. In other embodiments, one of the retainers is a substantially rigid, unitary portion of the mounting member, and the other retainer is substantially rigid, so that the cartridge bearing assembly can withstand heavier loads. In the latter embodiments, the bearing member is press fit between the retainers, which are precisely dimensioned and spaced.

5 Claims, 6 Drawing Figures

CARTRIDGE BEARING ASSEMBLY

This application is a continuation of application Ser. No. 495,410, filed May 17, 1983, now abandoned, which is a continuation-in-part of application Ser. No. 257,098, filed Apr. 24, 1981, now U.S. Pat. No. 4,392,753, issued July 12, 1983, which is a continuation of application Ser. No. 81,614, filed Oct. 3, 1979, now abandoned.

BACKGROUND OF THE INVENTION

1. Field of the Invention

This invention relates to the construction and metallurgy of journal bearings, and more particularly to self-aligning, self-lubricating cartridge bearings of simple construction and low cost which can be marketed in the same manner as and used in place of more expensive ball bearings.

2. Description of the Prior Art

The art of journal bearings is well-developed. The following patents define the state of the art prior to the present invention.

My U.S. Pat. No. 2,761,746 granted on Sept. 4, 1956 described a self-contained package sleeve bearing which employed a sintered metal bearing material having a low PV rating, the PV rating being the product of the load on the bearing in pounds per square inch multiplied by the surface velocity in feet per minute.

My U.S. Pat. No. 2,922,682 granted Jan. 26, 1960 described a self-aligning and self-lubricating bearing of simple construction. The bearing was fabricated of sintered metal having porous properties which enabled lubricating oil applied to its outer surface to penetrate through the body of the bearing to the rotating motor shaft. The bearing was of spherical shape and rotated in its support and was self-aligning with respect to the motor shaft.

My U.S. Pat. No. 3,034,838 granted May 15, 1962 described a bearing permitting limited universal movement of the rotating motor shaft. The bearing was made of a porous bushing of bronze or like bearing material having a truncated spherical outer surface.

U.S. Pat. No. 3,317,256 to Ernest granted on May 2, 1967 described a bearing unit having a lubricant reservoir with a retainer for housing the lubricant, the retainer being adapted to be secured to relatively thin sheeted plates. The bearing was preferably an oil-impregnated sintered bronze.

My U.S. Pat. No. 3,655,249 granted on Apr. 11, 1972 described a self-contained, hydrodynamically lubricated packaged sleeve bearing having inner and outer races similar to the inner and outer races of a ball bearing. The outer race was rotatably journaled on the inner race by a plurality of arcuate aluminum bearing elements. A wicking material impregnated with special oil for lubricating aluminum bearing surfaces was packed in the bearing and the bearing was closed to contain and recirculate the oil. In the preferred embodiment, the aluminum metal bearing comprised a plurality of arcuate bearing elements cut and formed from an extruded aluminum wire or rod. The bearing elements were assembled between the inner and outer races to provide limited universal movement between the inner and outer races to compensate for shaft misalignment.

And finally, my U.S. Pat. No. 4,008,928 granted Feb. 22, 1977 described a self-aligning pod bearing assembly including a cylindrical casing forming a socket for a bead-shaped porous bearing which was urged against the socket by means of a resilient bearing retainer which fitted between a shoulder portion of the casing and the spherical bearing. The inside of the casing was filled with wicking material exposed through the bearing retainer to an oil slinger mounted for rotation with the shaft adjacent the end of the bearing contacted by the retainer. Another oil slinger was rotationally mounted on the shaft adjacent the other end of the bearing. In the preferred embodiment, the outer diameter of the casing was formed by the same casing member which formed the interior bearing socket thus insuring coaxiality of the nominal bearing axis and the outer diameter of the casing.

SUMMARY OF THE INVENTION

The present invention is a self-aligning, self-contained, self-lubricated cartridge bearing assembly which is economical and simple in construction and metallurgy, and yet provides a quality cartridge bearing assembly having a high PV rating.

There are several important contributions to the progress of the useful art of journal bearings in the present invention. Of particular importance is the fact that, although aluminum is a notoriously treacherous metal when used in bearings, this invention is, for the first time, a commercially satisfactory journal bearing assembly having a bearing member which can be made of low cost die cast aluminum alloy.

The inventive cartridge bearing assembly includes a bearing member, which can be nonporous, having a central bore sized to receive a rotatable shaft in a bearing relationship. The bearing member has a radially-extending aperture extending from its central bore to its outer surface. The bearing member may be made of aluminum alloy. A contactor is inserted in the radially-extending aperture of the bearing member and contacts the rotatable shaft. The contactor is made of fibrous material. The bearing member is supported by support means provided inside a mounting member having an outer surface and an inner surface. A lubricant-impregnated wicking material is located inside the bearing assembly in contact with the contactor. An oil slinger sized to fit on the rotatable shaft for rotation therewith is positioned adjacent to the bearing member to sling lubricant radially outward. End caps are provided for retaining the lubricant-impregnated wicking material inside the bearing assembly. In some embodiments, the retainers are resilient spring elements which, by their resilience, hold the bearing members in a captive ball and socket configuration. In other embodiments, one of the retainers is a rigid, unitary portion of the mounting member, and the other retainer has considerable rigidity, so that the cartridge bearing assembly can withstand heavier loads. In the latter embodiments, the bearing member is press fit between the retainers, which are precisely dimensioned.

In the embodiment employing relatively rigid retainers, the cartridge bearing assembly can support greater loads. Since the retainers are relatively rigid, their dimensions and the dimension of the space between them are precisely controlled because variations in dimensions can not be accommodated by the resiliency of the retainers, as they can be by the spring retainers of the earlier described embodiments. The dimensions are chosen so that the relatively rigid retainers clamp the bearing member between them in a press fit. The precise dimensioning permits the retainers to be relatively rigid and, as a result, one of the retainers can be formed unitarily, in one piece, with the mounting member, as in a die casting operation. Thus, the unitary mounting member and retainer can be mass produced inexpensively and, at the same time, the assembly step of connecting one retainer with the mounting member can be eliminated.

DESCRIPTION OF THE PREFERRED EMBODIMENTS

The self-aligning bearing assembly described herein is referred to as a cartridge journal bearing because the bearing member is housed within a cylindrical mounting member adapted to be fitted in a mounting hole, for example, in the end bell of an electric motor. In this way, the cartridge bearing can be employed as a direct replacement for other types of bearings having a cylindrical casing, such as ball bearings, commonly used in high quality fractional horsepower motors. Several preferred embodiments of the cartridge bearing assembly will be described.

Figure 1:
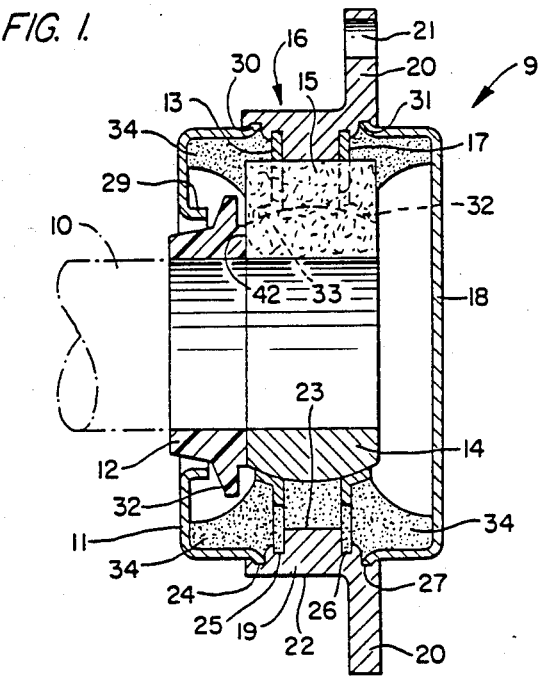
FIG. 1 is a vertical cross-sectional view through the longitudinal axis of the first embodiment of a cartridge bearing assembly constructed in accordance with the principles of the invention.
Figure 2:
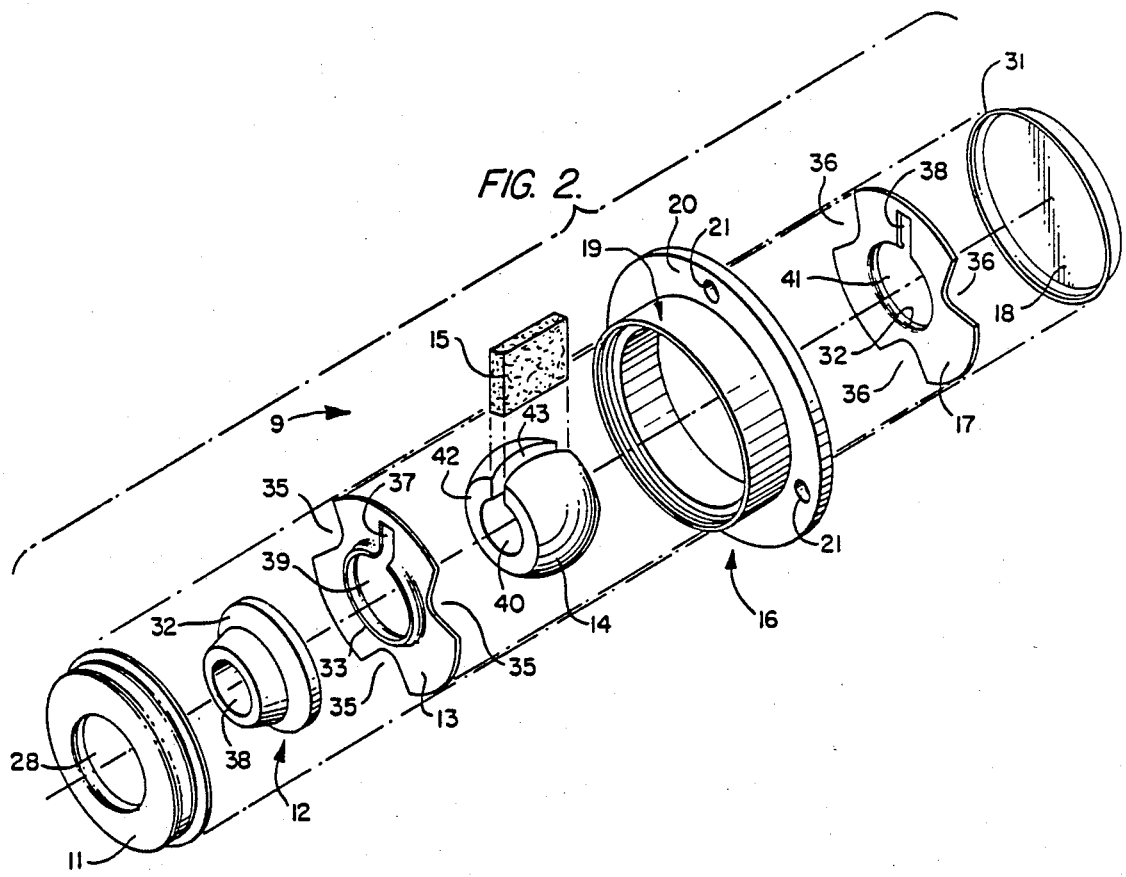
FIG. 2 is an exploded perspective view of the cartridge bearing assembly of FIG. 1.

The First Preferred Embodiment (FIGS. 1 and 2)

The first preferred embodiment is shown in FIGS. 1 and 2. This embodiment is for applications where the journal shaft extends beyond the bearing at only one end, for example, where the bearing assembly is used to support the rotor shaft at the blind end of an electric motor.

As shown in FIG. 1, cartridge bearing assembly 9 supports rotatable shaft 10. FIG. 2 illustrates the disassembled structural elements of bearing assembly 9, except for oil-impregnated wicking material 34 which is shown only in Fig. 1. These structural elements in FIG. 2 are: end cap 11; oil slinger 12; bearing retainer 13; bearing member 14; contactor 15; mounting member 16; bearing retainer 17; and, end cap 18.

Ring-shaped end cap 11, which is made of a relatively thin, durable material (such as sheet metal), has a central coaxial aperture 28 of sufficient diameter to allow the passage of shaft 10 without contact. The inner edge of cap 11 curves inwardly to form annular lip 29 (FIG. 1). The outer edge of cap 11 curves outwardly to form annular lip 30. End cap 18 is made of the same material as cap 11. The outer edge of cap 18 curves outwardly to form annular lip 31; cap 18 has no central aperture.

Ring-shaped oil slinger 12, which also functions as a thrust bearing, has radially-extending flange 32 and bore 38 for receiving shaft 10. Oil slinger 12 is press-fitted on journal shaft 10 so that it rotates on the shaft at a location adjacent to the truncated or planar side 42 of bearing 14. The barrel portion of oil slinger 12 extends out through opening 28 (FIG. 1).

Circular bearing retainer 13 has central aperture 39 of sufficient diameter to pass shaft 10 without contact and radial inner lip 33 defining a spherical annulus. Retainer 13 has peripheral notches 35 and vertical slot 37 to receive contactor 15. Bearing retainer 17, having central aperture 41, peripheral notches 36, radial inner lip 32 defining a spherical annulus, and vertical slot 38, is identical to retainer 13. As shown in FIG. 2, retainer 17 faces end cap 18 while retainer 13 faces end cap 11. Retainers 13 and 17 are made of a relatively thin, durable resilient material, such as sheet metal.

Bearing member 14 is preferably a bead-shaped, truncated spherical nonporous bearing with central bore 40, spherical outer surface and radially-extending full length window or aperture 43 which receives contactor 15. As shown in FIG. 1, bearing 14 is held in place by the spherical annulus of lip 33 and the spherical annulus of lip 32. In this way, bearing 14 is gripped by the spring resilience of the retainers 13 and 17 in a captive ball-and-socket configuration allowing universal pivoting about the center of the spherical bearing. Thus, bearing 14 is self-aligning. Bore 40 has an inside diameter slightly larger than the outside diameter of shaft 10 (e.g., there exists a bearing clearance) so that shaft 10 rotates freely in bearing 14 while bearing 14 remains stationary. Alternatively, bearing 14 can be made in a cylindrical bushing configuration (not shown), but the advantage of self-alignment is sacrificed.

For the first time in the art of journal bearings, the bearing member can be made of die cast aluminum alloy, having a solid, nonporous outer surface. Bearing 14 can be die cast under pressure from molten aluminum. Bore 40 is sized by machining, but no other machining is necessary. That the nonporous die cast bearing may thereafter be machined does not change the fact that it is die cast metal as contrasted to sintered metal, for example. Thus, one advantage of this invention is the low cost. Another advantage is that bore 40 can be machined to fit various shaft sizes; this simplifies production and inventory.

A preferred aluminum alloy has the following metallurgical analysis (percentages by weight):

| Cu | Ni | Fe | Si | Cr | Mg | Mn | Zn | Ti | Al |
|---|---|---|---|---|---|---|---|---|---|
| 3.30 | 0.02 | 1.0 | 8.60 | 0.06 | 0.10 | 0.43 | 0.80 | 0.03 | Balance |

Rectangular contactor 15 fits in window 43. It extends above bearing 14 through slot 37 in retainer 13 and slot 38 in retainer 17. Contactor 15 can be made of F-5 felt, which is denser or more tightly matted than F-12 felt which is commonly used for lubricating sleeve bearings. Contactor 15 can also be an improved contactor of the type described in my copending patent application, Ser. No. 618,337, filed Oct. 1, 1975, now U.S. Pat. No. 4,174,139 granted on Nov. 13, 1979 and entitled Bearing Assembly with Improved Contactor, which is incorporated herein by reference. In general terms, that improved contactor is formed by compressing a fibrous material, such as cotton linters, in a mold of appropriate shape to a predetermined density and by saturating the compressed fibers with a bonding and coating agent, such as dissolved nylon, which forms a somewhat solid mass and which contains a network of interconnected pores throughout. The pores are smaller than the interstices between the fibers in the wicking material so that the oil will be drawn into the contactor by capillary action. This can be accomplished by making the density of the fibers in the contactor, before the bonding agent is added, greater than the density of the similar fibers used in the wicking material. The improved contactor releases to the bearing surfaces a greater percentage of the oil held by the wicking material than did the prior art contactors.

As shown in FIG. 1, a lubricant-impregnated wicking material 34 partially fills the space between end cap 11 and spring retainer 13 and the space between spring retainer 17 and end cap 18. Wicking material 34 completely fills the compartment between spring retainers 13 and 17, thereby surrounding the outer surface of bearing 14 and contactor 15. Alternatively, contactor 15 can be eliminated and wicking material 34 can fill aperture 43 and contact shaft 10.

The wicking material can be felt or other wicking material, but perferably comprises cellulose fibers as described in my U.S. Pat. No. 2,966,459 granted on Dec. 27, 1960 and my U.S. Pat. No. 3,466,244 granted on Sept. 9, 1969. This wicking material is sold commercially under the trademark "PERMAWICK".

However, the term "lubricant-impregnated wicking material" is not to be construed as limited to wicking materials in which the oil-absorbing portion of the material is made of fibers. This term is intended to include any fluent oil-impregnated material in which oil-absorbing solids are present.

The bearing oil which is mixed with the wicking material is a bearing oil specially blended for lubricating aluminum bearings. Examples of such aluminum bearing oils are described in U.S. Pat. No. 3,208,941 granted on Sept. 28, 1965 and entitled Olefin-Unsaturated Ester Lubricants, U.S. Pat. No. 3,208,940 granted on Sept. 28, 1965 and entitled Lubricating Compositions and Methods of Lubricating, and U.S. Pat. No. 3,280,027 granted on Oct. 18, 1966 and entitled Lubricants and Lubricated Structures.

Preferably, the aluminum bearing oil is mixed with the cellulose fibers, as described in my U.S. Pat. No. 3,466,244, to form a mixture of the aluminum bearing oil and the fibers in the proportions described therein which can be injected into the bearing assembly. The extrusion or injection of the wicking material may be carried out by the extrusion machinery and methods described in my U.S. Pat. No. 3,053,421 granted on Sept. 11, 1962 and entitled Injection Machines For Wicking Material, my U.S. Pat. No. 3,226,801 granted on Jan. 4, 1966 and entitled Fiber Producing Machine Which Delivers Wicking Material Made Therefrom Into A Bearing Well And The Method Therefor and my U.S. Pat. No. 3,273,668 granted on Sept. 20, 1966 and entitled Extrusion Apparatus And Method. Since the oil-impregnated wicking material used in bearing assembly 9 is the same as that described in my U.S. Pat. No. 3,466,244, with the exception that a known aluminum bearing oil (described above) is used in place of the bearing oil disclosed in my patent, the mixture will not be described in greater detail.

The aluminum bearing oil in wicking material 34 is drawn by capillary action to contactor 15. Contactor 15 applies the oil to shaft 10 to form a lubricating oil surface (e.g., hydrodynamic lubricating conditions are realized at a certain shaft speed) to isolate the shaft from the bearing surface. As the oil works its way out of bore 40 it is slung back into the body of wicking material 34 by means of radial flange 32. The oil is reabsorbed by the wicking material, circulated to the contactor 15 and then to the shaft. This provides a completely self-contained recirculating system which will lubricate the bearing for a long period of time.

In this first embodiment, mounting member 16 comprises an elongated barrel portion 19 having a radially-extending circumferential mounting flange 20. Flange 20 is provided with holes 21 for receiving suitable fastening means (bolts, screws, etc.) to securely mount the bearing assembly. Barrel portion 19 has a smooth cylindrical outer surface 22 and a coaxial bore with smooth cylindrical inner surface 23 and four annular shoulders 24, 25, 26 27 (FIG. 1).

Mounting member 16 is made of rigid, durable material, such as hard molded plastic, machined metal (e.g., machined aluminum), or, preferably, die cast metal (e.g., die cast aluminum or zinc). The outside diameter of barrel portion 19 will be dictated by the particular application. For example, if bearing assembly 9 is to replace a ball bearing, the outside diameter of barrel portion 19 would match the outside diameter of the ball bearing.

A significant advantage of the die cast preferred embodiment of mounting member 16 is that it can be die cast of aluminum alloy with barrel portion 19 having a large outside diameter and a small bore. Different size inside and outside diameters can be produced thereafter by simply machining excess material from the outside and the bore. In this way, one basic die cast mounting member 19 can be easily modified to replace several of the different standard size ball bearings.

In production, bearing retainer 17 is inserted in mounting member 16 and seated on shoulder 26. The edge of shoulder 26 is peened over with a tool so that the outer edge of retainer 17 is tightly gripped in place. End cap 18 is seated on shoulder 27 of mounting member 16. Again, a tool is used to peen over the edge of shoulder 26 to securely grip lip 31. Bearing 14 is placed in aperture 41. Contactor 15 is inserted in window 43 and through slot 38.

Bearing retainer 13 is inserted in mounting member 16, around bearing 14 and over contactor 15. The edge of retainer 13 is seated on annular shoulder 25. The edge of annular shoulder 25 is then peened over with a tool so that the edge tightly grips retainer 13. Oil-imperganted wicking material 34 is then injected into the space between end cap 18 and retainer 17, into the compartment between retainers 13 and 17, and around retainer 13 as shown in FIG. 1. Oil slinger 12 and end cap 11 are placed in mounting member 16. Lip 30 is seated on annular shoulder 24. A tool is used to complete bearing assembly 9 by peening over the edge of shoulder 24 to securely grip lip 30.

Figure 4:
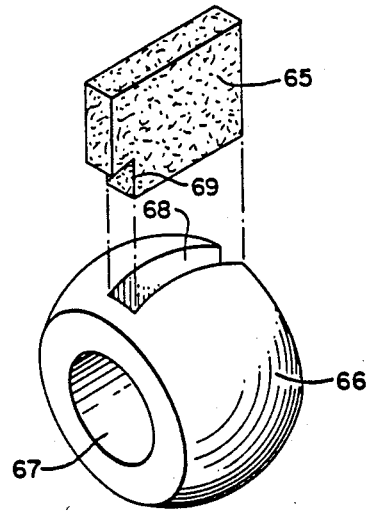
FIG. 4 is an exploded view of an alternative embodiment of the inventive bearing member and contactor.

The Second Preferred Embodiment (FIG. 4)

Figure 3:
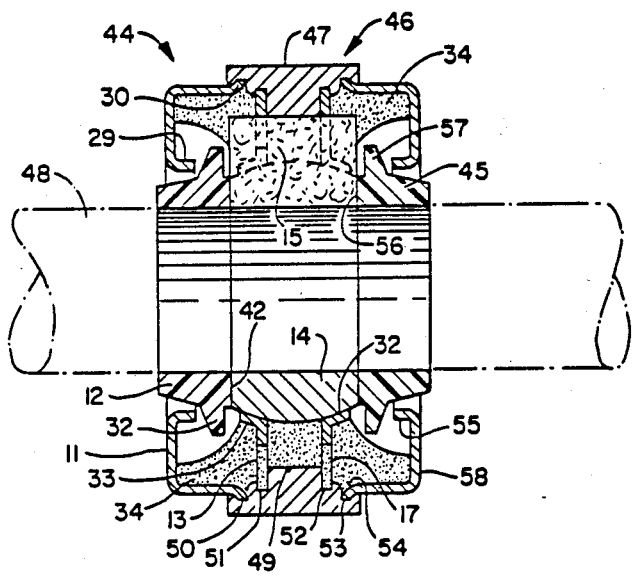
FIG. 3 is a vertical cross-sectional view through the longitudinal axis of the second embodiment of a cartridge bearing assembly constructed in accordance with the principles of the invention.

The second preferred embodiment of the invention is illustrated in FIG. 3. This embodiment is for applications where the journal shaft extends beyond the bearing in both directions, for example, where the bearing assembly is used to support the rotor shaft at the output end of an electric motor. As shown in FIG. 3, cartridge bearing assembly 44 supports rotatable shaft 48 which extends beyond the bearing assembly at both ends.

The following elements shown in FIG. 3 are the same as in FIGS. 1 and 2 and have the same reference numerals: end cap 11, having inner lip 29 and outer lip 30; oil slinger 12, having flange 32; spring retainer 13, having lip 33; spring retainer 17, having lip 32; bearing 14, having planar side 42 and planar side 56; contactor 15; and wicking material 34.

End cap 58 (FIG. 3), having inner lip 55 and outer lip 54, is identical to end cap 11. Oil slinger 45, having flange 57, is identical to oil slinger 12.

In this second embodiment, mounting member 46 has a smooth cylindrical outer surface 47 and a coaxial bore with smooth cylindrical inner surface 49 and four annular shoulders 50, 51, 52, 53.

As in the previous embodiment, mounting member 46 is made of rigid, durable material, such as hard molded plastic, machined metal (e.g., machined aluminum), or, preferably, die cast metal (e.g., die cast aluminum or zinc). The outside diameter of mounting member 46 will be dictated by the particular application. For example, if bearing assembly 44 is to replace a ball bearing, the outside diameter of mounting member 46 would match the outside diameter of the ball bearing. Furthermore, the die cast preferred embodiment of mounting member 46 can be die cast of aluminum alloy with a large outside diameter and a small bore. Different size inside and outside diameters can be produced thereafter by simply machining excess material from the outside and the bore, so that one basic die cast mounting member 46 can be easily modified to replace several of the different standard size ball bearings.

In production, bearing assembly 44 is made in a manner similar to that described above for bearing assembly 9, the first embodiment.

FIG. 4 illustrates an alternative embodiment of the bearing member and contactor. In FIG. 4, bearing 66 is made of aluminum alloy as described above for bearing 14. Bearing 66 is identical to bearing 14, except radially-extending window 68 is a partial-length window instead of a full-length window. Similarly, rectangular contactor 65 has notch 69 cut from one corner for proper seating in window 68. The top portion of contactor 65 extends above window 68 and above the remainder of bearing 66. One advantage of this alternative embodiment is that bearing 66 is stronger (because the window does not extend the full length of the bearing) and hence is less subject to distortion under very heavy shaft loads.

Figure 5:
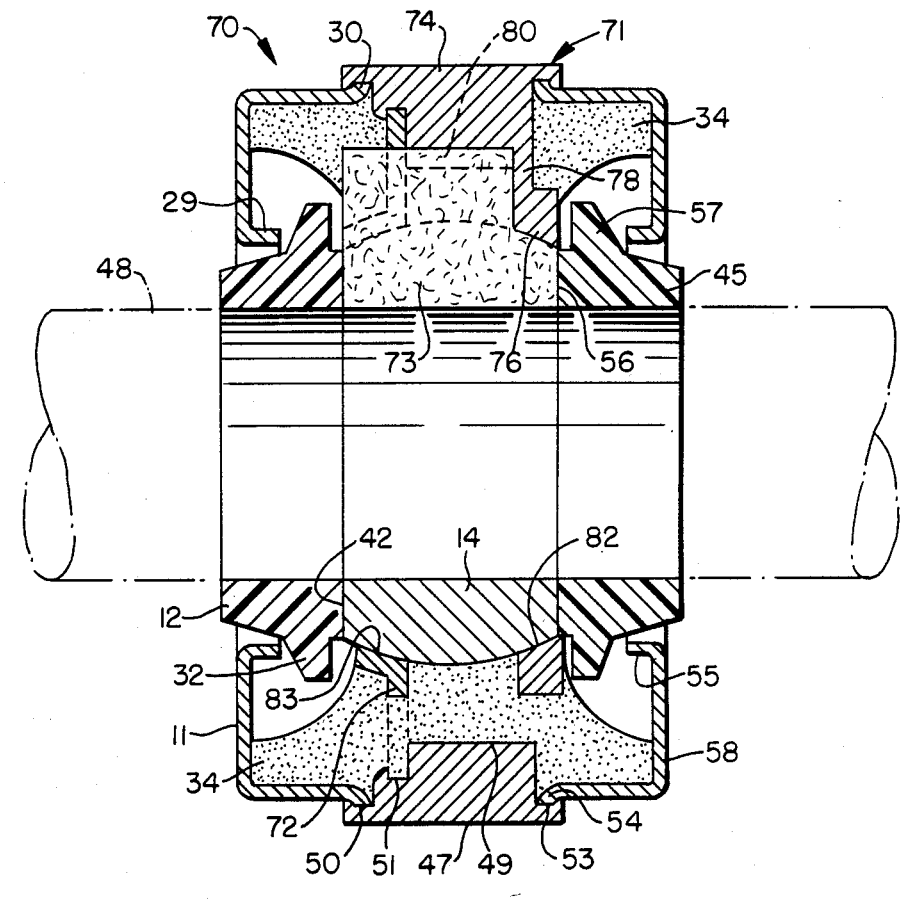
FIG. 5 is a vertical cross-sectional view through the longitudinal axis of a third embodiment of a cartridge bearing assembly constructed in accordance with the principles of the invention.

A Third Preferred Embodiment (FIG. 5)

As can be seen from FIG. 5, an embodiment of cartridge bearing assembly according to the present invention is contemplated which is similar to the embodiment of FIG. 3 in many respects. The following elements shown in FIG. 5 in a cartridge bearing assembly 70 are the same as in FIG. 3: end caps 11 and 58, having inner lips 29 and 55, respectively, and outer lips 30 and 54, respectively; oil slingers 12 and 45, having flanges 32 and 57, respectively; bearing 14, having planar side 42 and planar side 56. However, instead of using resilient spring retainers 13 and 17 to clamp the bearing 14 by means of their resiliency, the embodiment as shown in FIG. 5 employs stronger, substantially rigid retainers precisely spaced from one another such that they clamp the bearing 14 in a press fit. The increased strength of the retainers according to this embodiment permits the cartridge bearing assembly 70 to support greater loads than the previously described embodiments, especially loads transmitted radially through the bearing 14. Thus, the retainers are sufficiently rigid to support the load of the bearing 14. For such a load, a bearing 14 having a solid, nonporous bearing surface, such as a bearing made of die cast aluminum alloy, is required.

The embodiment of FIG. 5 is advantageous even where greater loads are not involved, because one retainer can be formed unitarily as a retainer portion of a unitary mounting member and retainer 71. For example, the unitary mounting member and retainer 71 can be die cast as one piece from zinc or other suitable material. Furthermore, where loads are small, a sintered bearing member can be used. The resilient spring retainer 13 of the previously described embodiments has been replaced by a similar, substantially rigid retainer 72, non-unitary with respect to the mounting member, which is relatively rigid compared to the spring retainer 13, so that it is capable of supporting greater loads. The substantially rigid retainer 72 can be made of a stronger, more rigid material than the spring retainer 13, or it can be made of the same material as the spring retainer 13, such as steel, but in a somewhat greater thickness in order to provide increased rigidity and strength. The substantially rigid retainer 72 can be secured to the unitary mounting member and retainer 71 in the same manner that the spring retainer 13 is secured to the mounting member 46 in the embodiment of FIG. 3. The contactor 15 has been replaced by a similar contactor 73, which has portions removed from the top and one side to accommodate the unitary mounting member and retainer 71.

Figure 6:
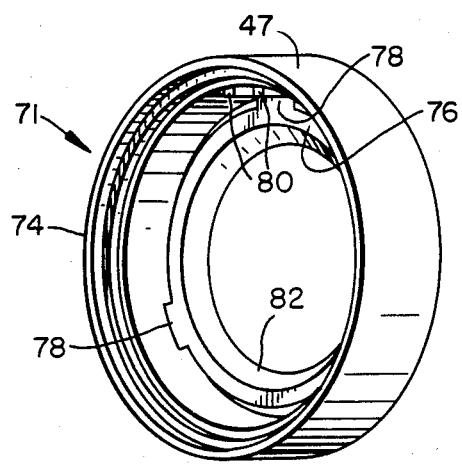
FIG. 6 is a perspective view of the rigid, unitary mounting member and retainer of the cartridge bearing assembly of FIG. 5.

As can best be seen from FIG. 6, the unitary mounting member and retainer 71 includes a mounting portion 74 and a retainer portion 76 supported coaxially within the mounting portion 74, substantially coplanar with one end of the cylindrical outer surface 47, by a plurality of webs 78. A pair of guide lugs 80 is provided on the cylindrical inner surface 49 of the mounting portion 74 to hold the top portion of the contactor 73 stationary. The retainer portion 76 includes an annular surface 82 and the relatively rigid retainer 72 includes an annular surface 83, both surfaces being curved in cross section in order to be complementary to the bearing 14 in a manner similar to that of the bearing retainers 13 and 17. The bearing 14 is effectively clamped in a press fit between the substantially rigid retainer 72 and the retainer portion 76 of the unitary mounting member and retainer 71. Since the retainer portion 76 is formed unitarily, as by die casting, with the mounting portion 74, it is stronger and more rigid than the spring retainer 17 of earlier described embodiments.

Although the precisely dimensioned, substantially rigid unitary mounting member and retainer 71 and the substantially rigid retainer 72 have been shown in connection with an embodiment for applications where the journal shaft extends beyond the bearing in both directions, it is understood that they can be employed in an embodiment, like that of FIG. 1, in which the journal shaft extends beyond the bearing at only one end. Furthermore, the above-described embodiments are intended to be illustrative, not restrictive. The full scope of the invention is defined by the claims, and any and all equivalents are intended to be embraced thereby.

What is claimed is:

1. A bearing assembly for supporting a rotatable shaft to be journalled in the bearing assembly comprising:
   (1) a bearing member having a spherical outer surface at each end thereof and a central bore sized to receive the rotatable shaft in a bearing relationship, said bearing member being pervious to the passage of oil from its outer surface to its central bore;

(2) a rigid cast mounting member having an outer surface, an inner surface and a radially inwardly extending mounting flange, said flange having a spherical surface near its inner edge slidably engaging the spherical surface at one end of the bearing, said flange having openings therein to enable lubricant to pass through the flange;

(3) a non-unitary retainer mounted on said support means and having a spherical surface near the inner edge thereof slidably engaging the spherical surface at the other end of said bearing member to clamp the bearing member between the unitary flange and the non-unitary retainer in a press fit whereby a first cavity is defined by the outer surface of said bearing member and inner surfaces of said mounting member, said flange and said retainer;

(4) an oil slinger positioned adjacent to each end of said bearing member to sling lubricant radially outward, said oil slingers being sized to be press fit on the rotatable shaft for rotation therewith;

(5) two cap means each defining second cavities that are disposed radially outwardly from each of said oil slingers and in communication with said first cavity through openings defined in said flange and said retainer; and (6) a lubricant-impregnated wicking material located within said first and second cavities and said openings defined in said flange and said retainer, such that oil slung by said slingers is received within said second cavities and transferred to said first cavity through said openings.

2. The bearing assembly defined in claim 1 wherein said cap means comprises a first end cap having adjacent said oil slinger a coaxial aperture for passage of the rotatable shaft and a second end cap having no aperture.

3. A bearing assembly as defined in claim 1 wherein said mounting member has an outer surface which is at least partially cylindrical and an inner surface which is at least partially cylindrical.

4. A bearing assembly as defined in claim 1 wherein said mounting member is made of zinc.

5. The bearing assembly defined in claim 1 wherein the annular surface is substantially coplanar with one end of said outer surface.

* * * * *